(12) United States Patent
Tolle et al.

(10) Patent No.: US 7,357,292 B2
(45) Date of Patent: Apr. 15, 2008

(54) FRICTION STIR WELDING TOOL

(75) Inventors: Charles R. Tolle, Idaho Falls, ID (US);
Denis E. Clark, Idaho Falls, ID (US);
Timothy A. Barnes, Ammon, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 536 days.

(21) Appl. No.: 11/049,557

(22) Filed: Feb. 1, 2005

(65) Prior Publication Data
US 2006/0169747 A1 Aug. 3, 2006

(51) Int. Cl.
*B23K 20/12* (2006.01)
*B29C 65/06* (2006.01)

(52) U.S. Cl. ............... 228/112.1; 228/2.1; 228/2.3; 228/114.5; 158/73.5

(58) Field of Classification Search ............... 228/2.1, 228/112.1
See application file for complete search history.

(56) References Cited

U.S. PATENT DOCUMENTS

| | | | |
|---|---|---|---|
| 4,636,124 A | 1/1987 | Gugle et al. | |
| 5,460,317 A | 10/1995 | Thomas et al. | |
| 5,769,306 A | 6/1998 | Colligan | |
| 5,971,247 A | 10/1999 | Gentry | |
| 6,079,609 A | 6/2000 | Fochtman | |
| 6,173,880 B1 | 1/2001 | Ding et al. | |
| 6,230,957 B1 | 5/2001 | Arbegast et al. | |
| 6,237,835 B1 | 5/2001 | Litwinski et al. | |
| 6,259,052 B1 | 7/2001 | Ding et al. | |
| 6,484,924 B1 | 11/2002 | Forrest | |
| 6,613,447 B2 | 9/2003 | Aota et al. | |
| 6,619,534 B2 | 9/2003 | Aota et al. | |
| 2004/0238599 A1* | 12/2004 | Subramanian et al. | 228/112.1 |
| 2005/0045695 A1* | 3/2005 | Subramanian et al. | 228/112.1 |
| 2006/0043152 A1* | 3/2006 | Stol et al. | 228/2.1 |

* cited by examiner

*Primary Examiner*—Sam Chuan Yao
*Assistant Examiner*—Nicholas P D'Aniello
(74) *Attorney, Agent, or Firm*—Wells St. John

(57) ABSTRACT

A friction stir welding tool is described and which includes a shank portion; a shoulder portion which is releasably engageable with the shank portion; and a pin which is releasably engageable with the shoulder portion.

33 Claims, 7 Drawing Sheets

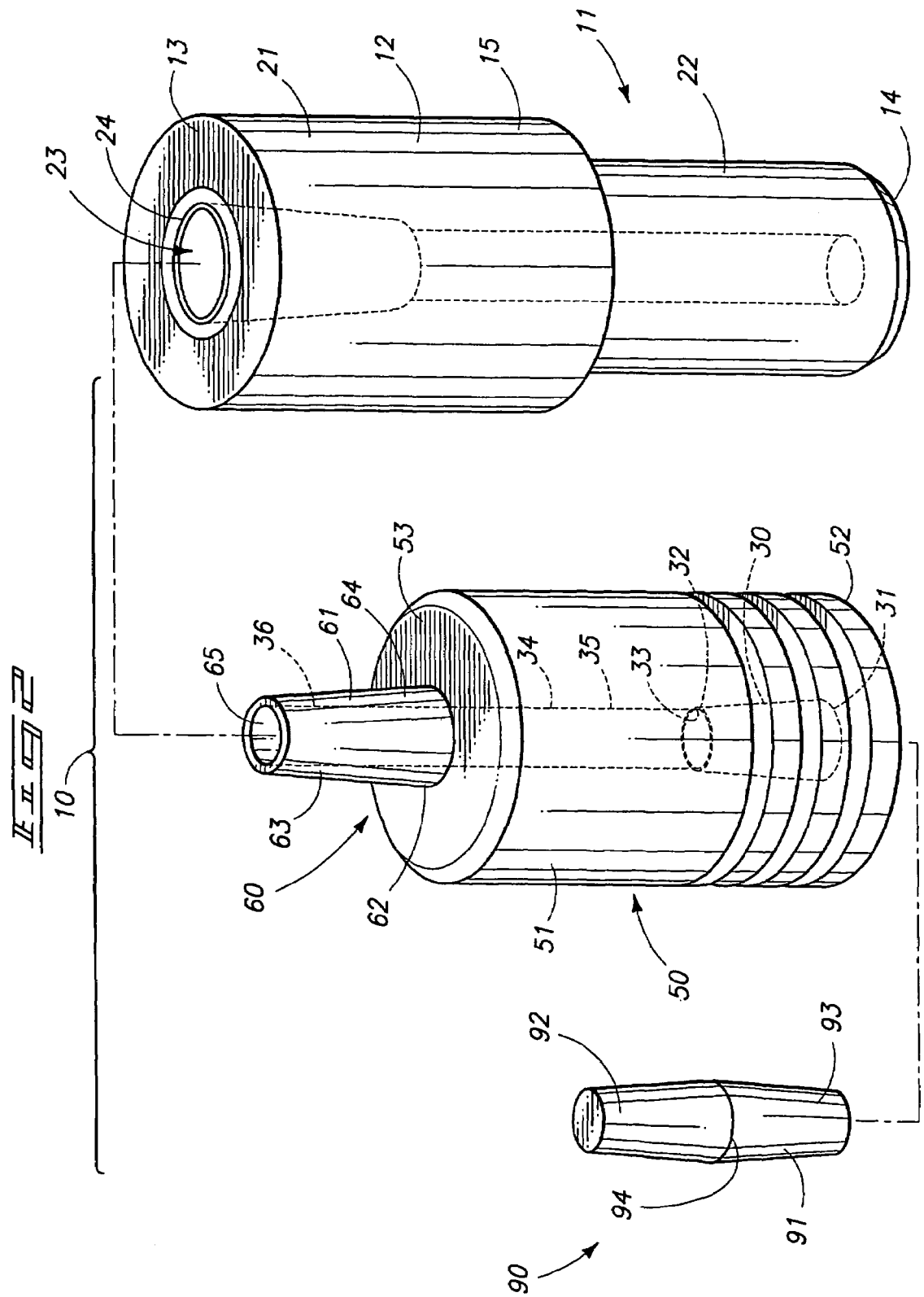

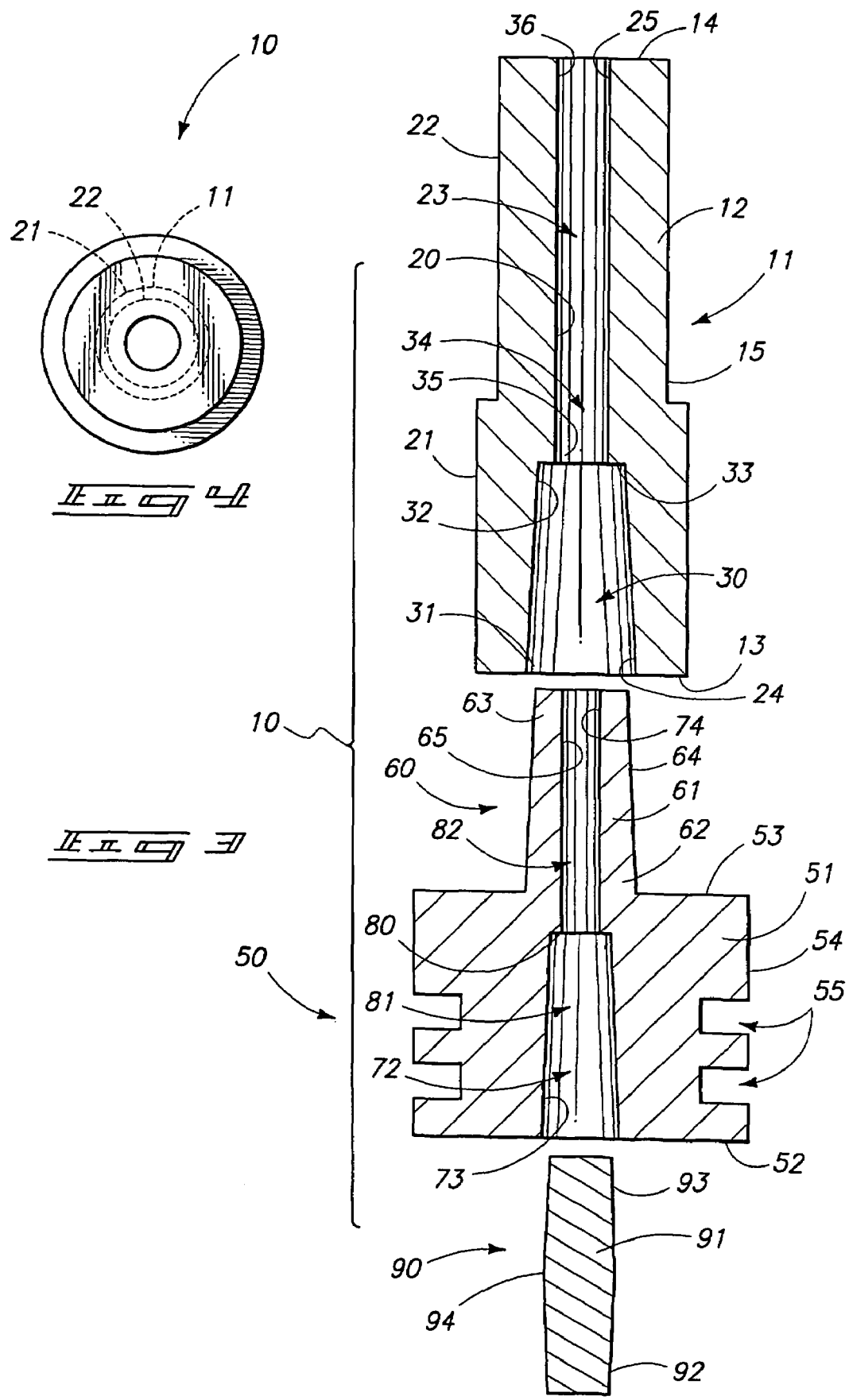

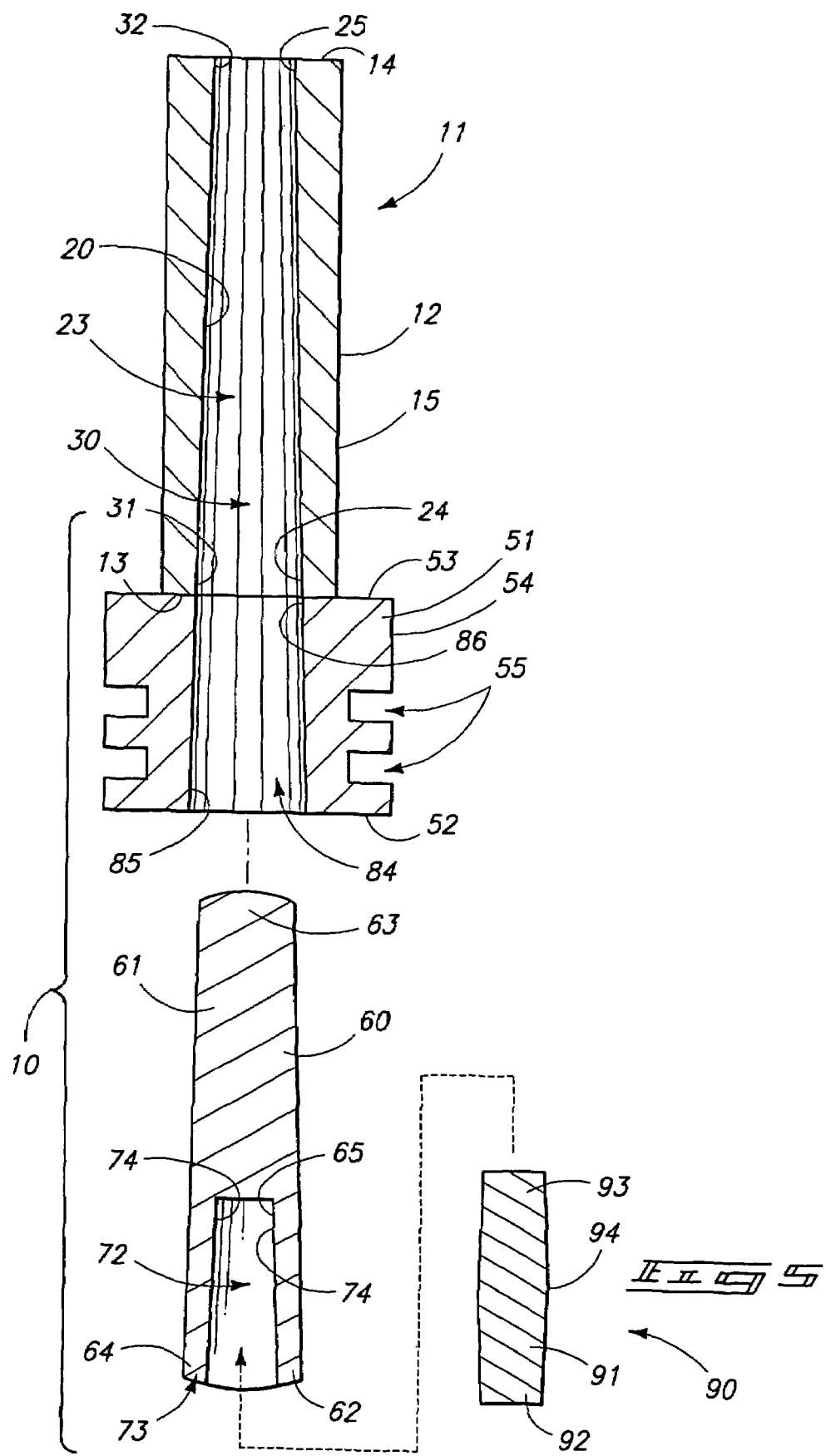

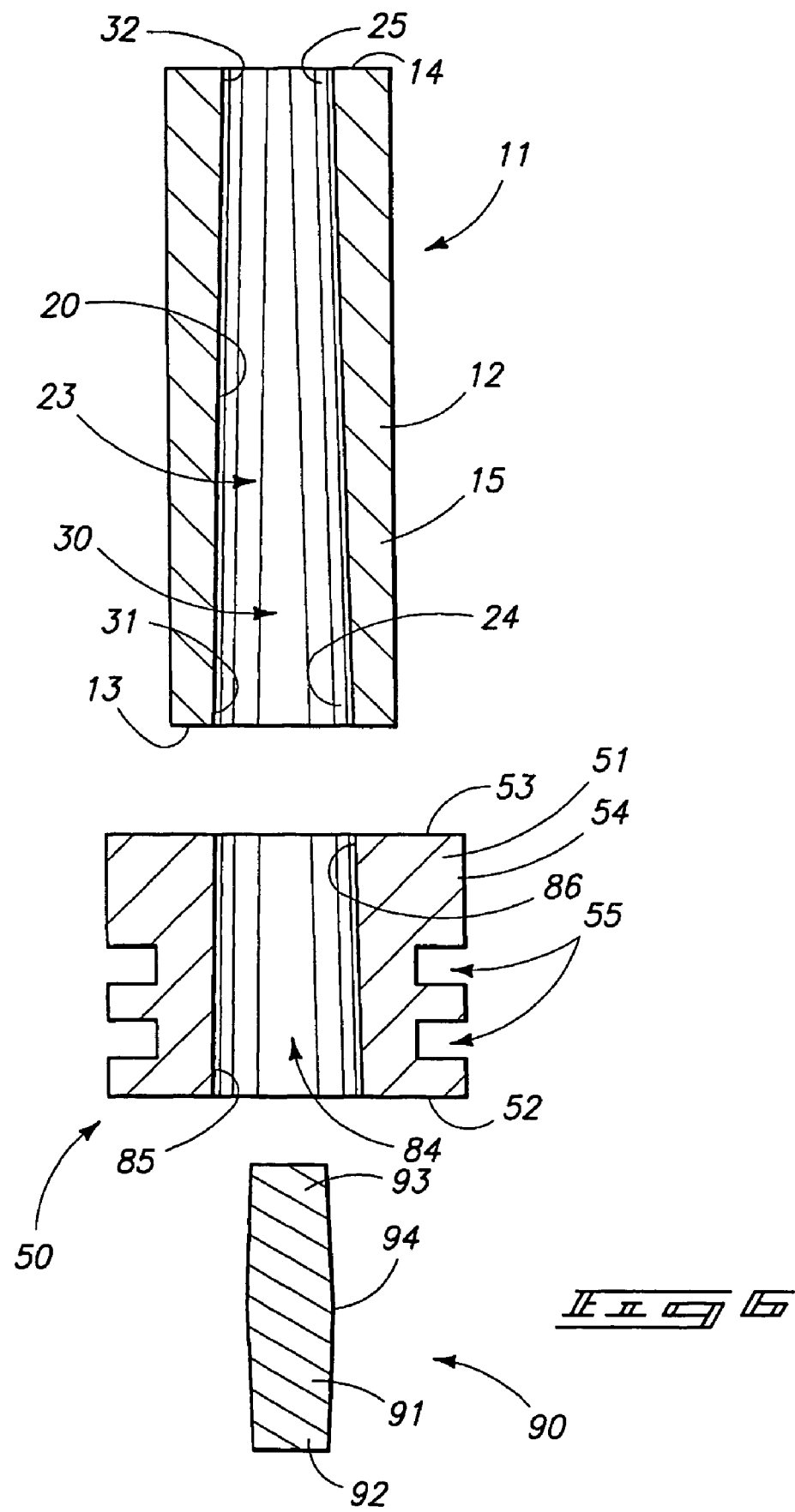

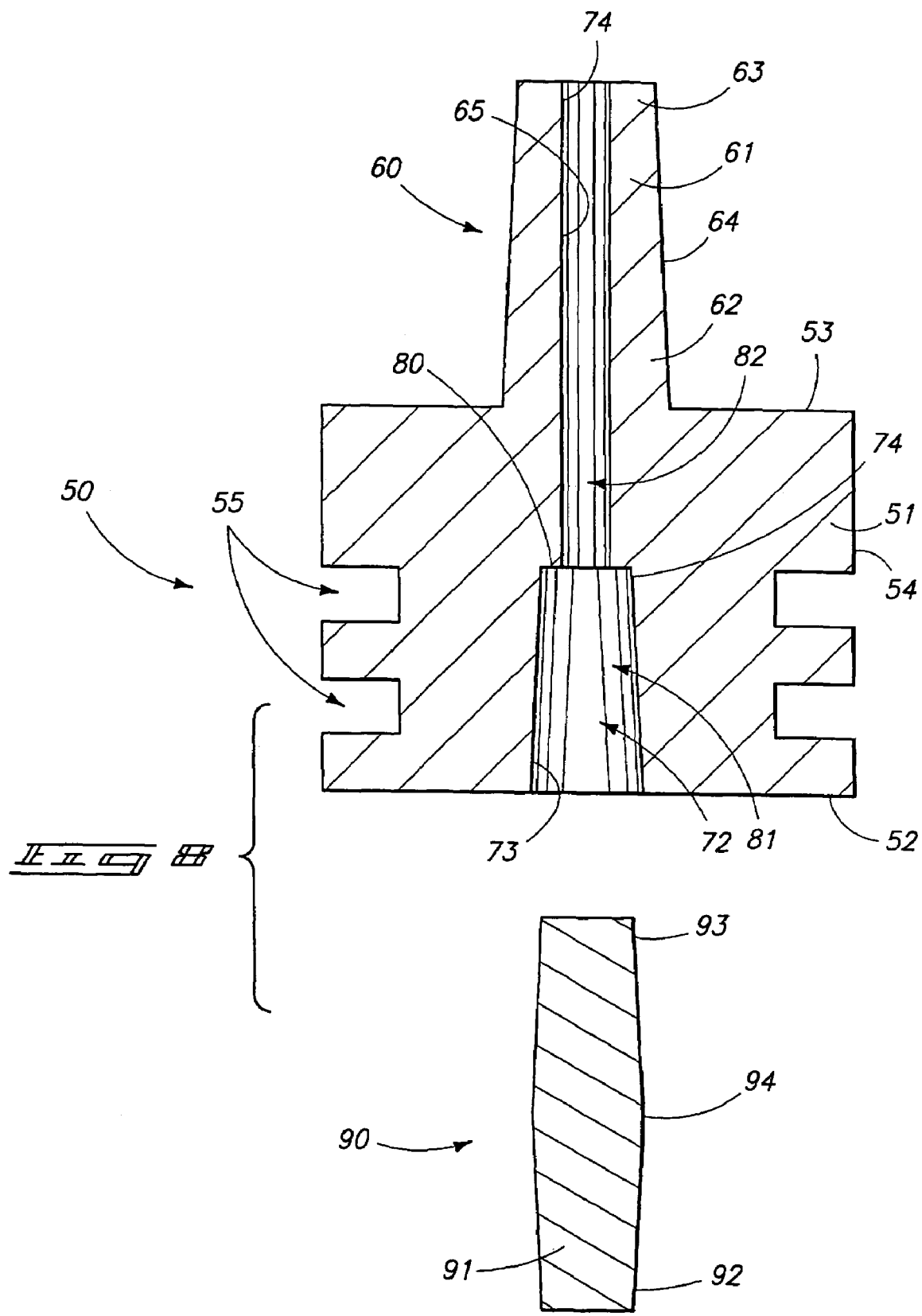

FRICTION STIR WELDING TOOL

GOVERNMENT RIGHTS

The United States Government has rights in the following invention pursuant to Contract No. DE-AC07-99ID13727 between the U.S. Department of Energy and Bechtel BWXT Idaho, LLC.

TECHNICAL FIELD

The present invention relates to friction stir welding tool, and more specifically to a friction stir welding tool which has parts which are replaceable, and are interchangeable, and which can be easily configured for welding different materials.

BACKGROUND OF THE INVENTION

The prior art is replete with numerous examples of friction stir welding devices which are useful in welding various materials. As a general matter, friction stir welding is a technique whereby a rotating tool is brought into forcible contact with an adjacent work piece to be welded and the rotation of the tool creates frictional heating of the adjacent work piece and extensive deformation as mixing occurs along a plastic zone. Upon cooling of the plastic zone, the work pieces are joined along a welding joint. Examples of prior art friction stir welding devices and other methodology are more fully disclosed in U.S. Pat. Nos. 4,636,124; 5,460,317; 5,769,306; 5,971,247; 6,079,609; 6,173,880; 6,230,957; 6,237,835; 6,259,052; 6,484,924; 6,613,447; and 6,619,534, the teachings of which are incorporated by reference herein.

While the prior art devices, and other methodology described above have operated with some degree of success on some materials, there has been identifiable shortcomings which have detracted from the utilization of this same welding technique for welding certain harder materials. For example, for higher strength materials, such as steel, titanium, and the like, suitable friction stir welding tools have been difficult to develop due at least in part to the temperatures, and the loads that the tool receives during the friction stir welding process. In this regard, and for currently available friction stir welding tools, it is well known that these tools have a limited life cycle. Still further, these same tools are often fabricated from relatively expensive materials. Consequently, such tools are quite costly. Currently, the lifespan of such friction stir welding tools is often measured in terms of feet or tens of feet of welding per tool.

In view of this shortcoming, the friction stir welding of high strength materials such as titanium, and steel, has largely been confined to highly specialized applications where cost is largely not an issue and the number of feet of material to be welded is typically quite limited.

Therefore a friction stir welding tool which avoids the shortcomings associated with the prior art practices and methodology is the subject matter of the present invention.

SUMMARY OF THE INVENTION

A first aspect of the present invention relates to a friction stir welding tool which includes a shank portion; a shoulder portion which is releasably engageable with the shank portion; and a pin which is releasably engageable with the shoulder portion.

Another aspect of the present invention relates to a friction stir welding tool which includes a shank portion which is defined by an elongated main body having opposite first and second ends, and wherein the elongated main body defines a passageway which extends from the first end, and in the direction of the second end; a shoulder portion having a main body with opposite first and second ends, and a male member which extends outwardly relative to the second end thereof, and wherein the male member of the shoulder portion is telescopingly received, at least in part, within the passageway as defined by the shank portion, and is operable to releasably frictionally engage the main body of the shank portion; and a pin which is releasably engageable with the shoulder portion and which extends outwardly relative to the first end of the shoulder portion.

Yet another aspect of the present invention relates to a friction stir welding tool which includes a shank portion having an elongated main body with a first end, and an opposite second end, and wherein the main body of the shank portion defines a first passageway having a diminishing cross-sectional dimension when this cross-sectional dimension is measured along a line extending from the first end of the main body in the direction of the second end thereof; a shoulder portion having a main body with a first and second end, and wherein the shoulder portion further has a male member which extends outwardly relative to the second end thereof, and wherein the male member has a size and shape which allows the male member to be releasably telescopingly received in the first passageway, and to be advanced to a position wherein the male member frictionally engages the shank portion, and wherein the shoulder portion further defines a second passageway which extends from the first end of the shoulder portion in the direction of the second end thereof, and wherein the second passageway is substantially coaxially aligned relative to the first passageway, and the male member, and wherein the second passageway has a diminishing cross-sectional dimension when measured along a line which extends from the first end of the shoulder portion toward the second end thereof; and a pin having a main body with opposite first and second ends and wherein the second end of the pin, and at least a portion of the main body of the pin are releasably telescopingly received in the second passageway, and wherein at least a portion of the main body of the pin frictionally engage the main body of the shoulder portion, and wherein the first end of the pin extends outwardly and is located in spaced relation relative to the first end of the shoulder portion.

These and other aspects of the present invention will become more apparent hereinafter.

BRIEF DESCRIPTION OF THE DRAWINGS

Preferred embodiments of the invention are described below with reference to the following accompanying drawings.

FIG. 2 is a perspective, disassembled side elevation view of the friction stir welding tool of FIG. 1.

FIG. 3 is an exploded, longitudinal vertical sectional view of a friction stir welding tool which employs the features of the present invention.

FIG. 4 is an end view of the friction stir welding tool of FIG. 3 showing some underlying surfaces in hidden lines.

FIG. 5 is an exploded, longitudinal, vertical sectional view of a friction stir welding tool which employs the teachings of the present invention.

FIG. 6 is a fragmentary, exploded, longitudinal vertical sectional view of a friction stir welding tool as seen in FIG. 5.

FIG. 8 is a greatly enlarged, fragmentary, longitudinal vertical sectional view of a portion of a friction stir welding tool employing the teachings of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
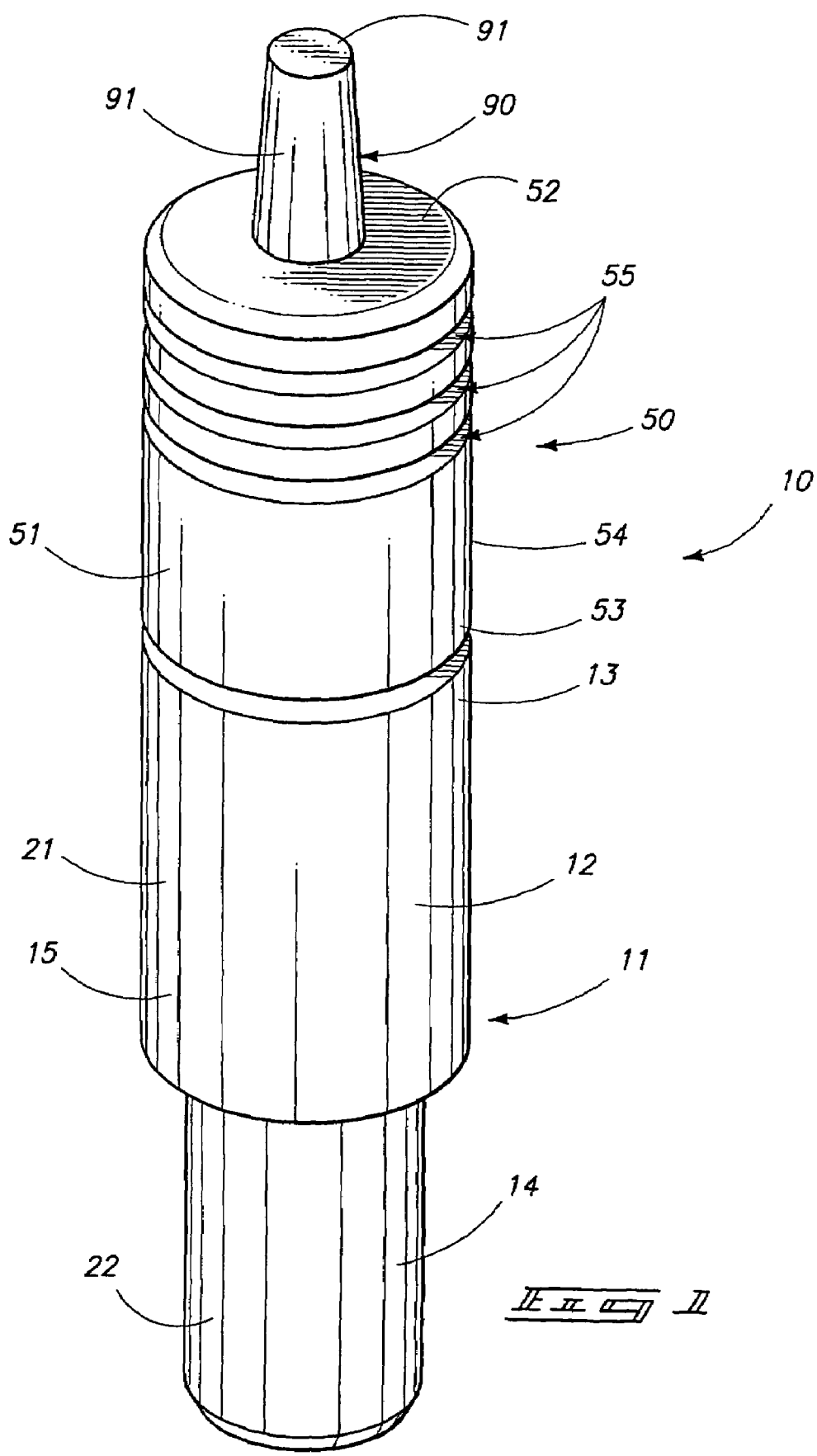
FIG. 1 is a perspective, side elevation view of an assembled friction stir welding tool of the present invention.

A friction stir welding tool of the present invention is generally indicated by the numeral 10 in FIG. 1 and following. Referring now to FIGS. 1 and 2 for example, the friction stir welding tool 10 of the present invention is illustrated, and which includes a shank portion 11. The shank portion is defined by an elongated main body 12 which has a first end 13, and an opposite second end 14 which is forcibly engaged by a machine (not shown) and which imparts rotational movement to the shank. The main body is defined by an exterior facing surface 15 and an opposite interior facing surface 20 (FIG. 3). As seen FIGS. 1, 2, 3 and 7, the shank portion and more specifically the exterior facing surface 15 may be defined by a first outside diametral portion 21 which has a diametral dimension of about 0.75 inches, and a second portion 22 having a second outside diametral dimension of about 0.625 inches. As seen in FIG. 2, the first portion having the first outside diametral dimension 21 is positioned adjacent to the first end 13, and the second portion 22 is positioned adjacent to the second end 14. As seen by reference to FIGS. 5 and 6, in one form of the friction stir welding tool 10 of the present invention, the exterior facing surface 15 may be substantially uniform in its outside diametral dimension when measured between the first and second ends 13 and 14 respectively. As will be appreciated, the first portion 21, and the second portion 22 may have various outside diametral dimensions depending upon the use for the tool, the amount of pressure that the tool might experience, and the thermal coefficient of expansion of the various materials that might be utilized to fabricate the individual portions of the friction stir welding tool 10 as will be described in greater detail hereinafter.

Figure 7:
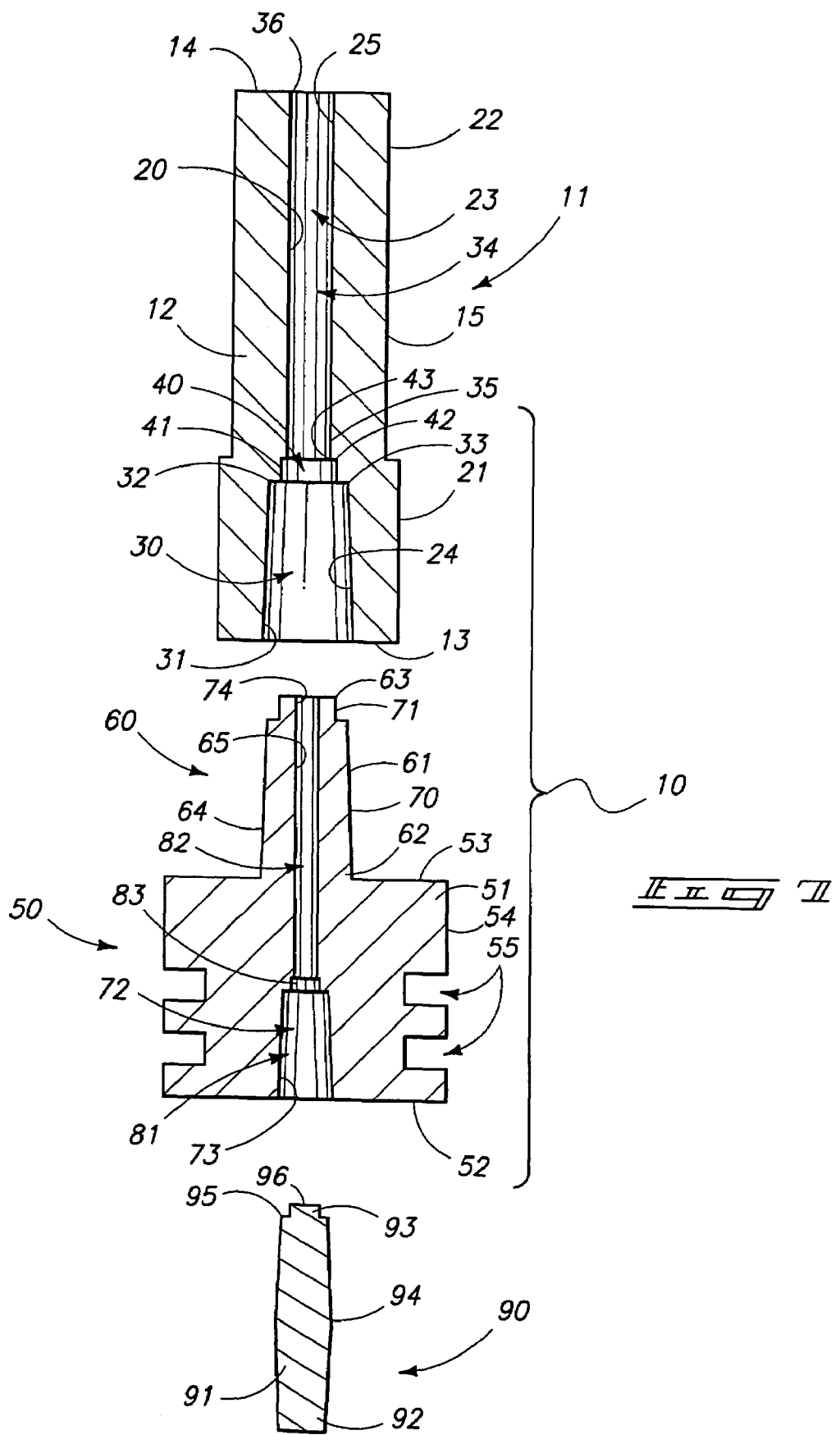
FIG. 7 is an exploded, longitudinal vertical sectional view of a friction stir welding tool which employs the teachings of the present invention.

Referring now to FIGS. 3-7, the interior facing surface 20 of the main body 12, as noted above, defines a longitudinally extending passageway 23 which extends from the first end 13 of the main body in the direction of the second end 14. The longitudinally extending passageway 23 has a first portion 30 which has a diametral dimension which diminishes when this dimension is measured from the first end 24 of the passageway 23, in the direction of the second end 25. As seen in FIG. 3, for example, this first portion 30 of the passageway is generally characterized by Jacob's Taper #1. The length of this first portion of the passageway 30 may be approximately 0.770 inches. In an alternative arrangement as seen in FIG. 6, for example, the longitudinally extending passageway 23 substantially uniformly tapers or is reduced in its inside diametral dimension from the first to the second end. This passageway and its diminishing inside diametral dimension is most accurately characterized as a pin taper #8. As illustrated by reference to FIG. 6, the length of the passageway 23 may be approximately about 2.250 inches. In the form of the invention as seen in FIG. 3, it will be understood that the first portion 30 of the passageway 23, has a first end 31 which is adjacent to the first end 13 of the main body 12, and an opposite second end 32, which is defined by a circumscribing seat 33. Still further, the longitudinally extending passageway 23 has a second portion 34, which has a first end 35, and an opposite second end 36 which is positioned adjacent to the second end 14 of the main body 12. In other forms of the invention, as seen in FIG. 7, for example, the longitudinally extending passageway 23 may include an intermediate portion 40 which is positioned between the first portion 30, and the second portion of the passageway 34. The intermediate portion 40 has an inside diametral dimension which is less than the inside diametral dimension of the first portion 30 but is greater than the inside diametral dimension of the second portion 34. The intermediate portion 40 has a first end 41 and an opposite second end 42. A circumscribing seat 43 is located at the second end. As seen in FIGS. 3 and 7, the second portion of the passageway 34 has a substantially uniform inside diametral dimension of about 0.188 inches. Still further, the intermediate portion 40 has a length dimension of about 0.094 inches.

As best understood by a study of FIGS. 2 and 3, the friction stir welding tool 10 of the present invention includes a shoulder portion, which is generally indicated by the numeral 50, and which is releasably engageable with the shank portion 11. As best illustrated in FIG. 3, for example, the shoulder portion has a main body 51 with opposite first and second ends 52 and 53, respectively. Still further, the main body 51 has an exterior facing surface 54 which has a plurality of circumscribing channels 55 formed therein. The circumscribing channels act to control heat flow within the friction stir welding tool during the friction stir welding process. It should be understood that the shoulder portion 50 may be cooled by a supplemental means in order to dissipate heat energy which is generated during the friction stir welding process. As best illustrated by reference to FIGS. 2-8, the shoulder portion 50 includes a male member which is generally indicated by the numeral 60, and which is received in releasably mating receipt within the longitudinally extending passageway 23 which is defined by the shank portion 11. The male member 60 has a main body 61, with a first end 62, and an opposite second end 63. Still further, the male member is defined by an exterior facing surface 64, and an opposite interior facing surface 65. In one form of the invention, as seen by reference to FIG. 7, the exterior facing surface 64 may be defined by a first portion 70 which has an outside diametral dimension which diminishes when measured from the first end 62 and in a direction of the second end 63 and further includes a second portion 71 which has an outside diametral dimension which is less than the outside diametral dimension of the first portion. As should be understood, the first and second portions 70 and 71 render the male member operable for substantially telescoping and friction engaging receipt within the longitudinally extending passageway 23 and more specifically the first portion 30 thereof. Still further, the second portion 71 is operable to be telescoping received within the intermediate portion 40 of the passageway 23.

As seen by reference to FIGS. 3-8, respectively, the shoulder portion 50 defines a pin passageway 72 which extends in some forms of the invention from the first end 52, and in the direction of the second end 53 of the main body 51. As illustrated by reference to FIG. 3, the pin passageway extends, in one form of the invention longitudinally therethrough the male member 60. The pin passageway 72 in this form of the invention has a first end 73 and an opposite second end 74. As seen in FIG. 3, which shows a greatly enlarged view of one form of a shoulder portion 50, a circumscribing seat 80 is formed inwardly of a first portion 81 of the pin passageway 72. As seen, the first portion 81 of the pin passageway has a diminishing inside diametral dimension when this is measured in a direction which extends from the first end 73, towards the second end 74 thereof. As seen in FIG. 7, and in this particular form of the invention, the pin passageway 72 includes a second portion 82 of substantially uniform inside diametral dimension which is coupled to the first portion 81, and which extends from the first portion 81 to the second end 74. As seen in FIG. 7, the pin passageway further defines an intermediate portion 83 which is positioned therebetween the first portion 81 and a second portion 82. The intermediate portion has an inside diametral dimension which is less than the inside diametral dimension for the first portion, but greater than the inside diametral dimension for the second portion.

Referring now to FIGS. 5 and 6, in yet another form of the invention it will be seen that the shoulder portion 50 in this form of the invention defines a passageway 84 for receiving the male member 60. As seen in the partially assembled arrangement of FIG. 5, the male member 60 defines the pin passageway 72 as described above. The passageway 84 formed in the shoulder portion has a first end 85 and a second end 86. As should be understood, the inside diametral dimension of the passageway 84 diminishes when it is measured along a line which extends between the first end 85 and the second end 86. In this fashion, and as seen in FIG. 5, the male member 60 is operable to be telescopingly received, at least in part, and frictionally secured within the passageway 84, and the pin passageway 72 is operable to receive a pin which will be described in greater detail hereinafter.

Referring now to FIG. 1 and following, the friction stir welding tool 10 of the present invention includes a pin 90 which is releasably engageable with the shoulder portion 50, and which is operable to engage a work piece to be welded (not shown). The pin 90 includes a main body 91 which has a first end 92 which engages the work piece (not shown), and a second end 93 which is received in the pin passageway 72 as defined by the shoulder portion 50. As illustrated, the pin is telescopingly received, at least in part, in the pin passageway 72 and extends generally longitudinally outwardly relative to the first end 52 of the main body 51. As illustrated, the pin has an intermediate portion 94, and as illustrated, the outside diametral dimension of the main body 91 of the pin 90 diminishes when measured from a position beginning at the intermediate portion 94, and extending outwardly to the opposite first and second ends 92 and 93. As illustrated in the drawings, the pin is releasably frictionally engaged by the main body 51 of the shoulder portion 50. In the various illustrations as provided, it will be seen that the outside diametral dimension of the pin forms a taper which allows a portion of the pin to be telescopingly received within the pin passageway 72.

In the arrangement as shown, the shank portion 11, shoulder portion 50 and pin 90 are fabricated from the same and/or dissimilar materials. In the various arrangements as shown, the shank portion 11, shoulder portion 50 and/or pin 90 may, depending upon the material being welded have a substantially similar thermal coefficient of expansion. In the arrangements as shown, the shank portion 11, shoulder portion 50 and pin 90 are fabricated from a metal or metal alloy which is selected from the group comprising high temperature refractory metals such as tungsten, molybdenum, rhenium and their alloys; ceramics such as boron nitride and related compounds; and tungsten and their related carbides.

OPERATION

The operation of the described embodiments of the present invention are believed to be readily apparent and are briefly summarized at this point.

In one of its broadest aspects, the present friction stir welding tool 10 of the present invention includes a shank portion 11; a shoulder portion 50 which is releasably engageable with the shank portion 11; and a pin 90 which is releasably engageable with the shoulder portion 50. In the arrangement as shown in the various drawings, the shank portion 11 has an elongated main body 12 which defines a substantially longitudinally extending passageway 23. In this arrangement, the shoulder portion 50 is received, at least in part, in the longitudinally extending passageway 23. In several of the forms of the invention as shown in the drawings, it should be noted, that the main body 12 of the shank has a first, and an opposite second ends 13 and 14, and the longitudinally extending passageway as described above 23 extends from the first end in the direction of the second end thereof. As seen in the drawings, the longitudinally extending passageway 23 has a diametral dimension which diminishes when measured from the first end 13, and in the direction of the second end 14. As seen with respect to one of the forms of the invention, and as seen in FIG. 3, the shoulder portion 50 includes a male member 60 which is received in releasably mating receipt within the longitudinally extending passageway 23. Still further, the shoulder portion 50 of the present invention defines a pin passageway 72 which extends from the first end 52 of the shoulder portion in the direction of the second end 53. As best illustrated by reference to FIG. 1, the pin 90 is telescopingly received, at least in part, in the pin passageway 72. Still further in the arrangement as shown, the male member 60 of the shoulder portion 50 typically extends substantially longitudinally outwardly relative to the second end 53 of the main body 51. As seen by a comparison of FIGS. 5 and 7, for example, in one form of the invention 10 the male member 60 may be made integral with the shoulder portion (FIG. 2), and in another form of the invention as seen in FIG. 5, the male member may be received in a passageway 84 which is defined by the shoulder portion 50. In the arrangement as seen in the FIGS. 5 and 6, the pin passageway 72 is defined by the male member which has been telescopingly received, within the passageway 84. In the arrangement as shown, the pin 90 is telescopingly received, at least in part, in the pin passageway 72 and the pin extends longitudinally outwardly relative to the first end 52 of the shoulder portion 50.

Therefore, a friction stir welding tool 10 of the present invention includes a shank portion 11 having an elongated main body 12 which defines a first passageway 23 having a diminishing cross-sectional dimension when this cross-sectional dimension is measured along a line extending from the first end 13 of the main body in the direction of the second end 14. The friction stir welding tool further includes a shoulder portion 50 having a main body 51 with a first and second end 52 and 53, respectively. The shoulder portion further has a male member 60 which extends outwardly relative to the second end thereof. The male member 60 has a size and a shape which allows the male member to be releasably telescopingly received, in the first passageway 23 and to be advanced to a position where the male member frictionally engages the shank portion 11. The shoulder portion 50 further defines a second passageway 72 which extends from the first end 52 of the shoulder portion in the direction of the second end 53 thereof. The second passageway is substantially coaxially aligned relative to the first passageway 23, and the male member 60. The second passageway has a diminishing inside diametral dimension when measured along a line which extends from the first end 52 of the shoulder portion 50 to the second end 53 thereof. The friction stir welding tool 10 further includes a pin 90 having a main body 91 with opposite first and second ends 92 and 93, respectively. In the arrangement as shown in the drawings, the second end of the pin 93 and at least a portion of the main body 91 of the pin are releasably telescopingly received in the second passageway 72, and at least a portion of the main body 91 of the pin 90 frictionally engages the main body 51 of the shoulder portion 50. The first end of the pin 92 extends longitudinally outwardly, and is located in spaced relation relative to the first end 52 of the shoulder portion 50. In the arrangement as shown, the shank portion 11, shoulder portion 50 and pin 90 are fabricated from substantially similar or dissimilar materials. Still further, the shank portion, shoulder portion and pin may be fabricated from materials which are selected to meet the welding needs of a given substrate which is being welded by the friction stir welding tool. In the arrangement as shown, the shank portion 11 has a length dimension of less than about 2.5 inches, and an outside diametral dimension of less than about 1 inch. Still further, the shoulder portion 50 includes a male member 60 which has a length dimension of less than about 1.75 inches; and a pin 90 which has a length dimension of less than about 1 inch. It should be recognized that these dimensions are somewhat arbitrary and other dimensions may be used with equal success.

Therefore, it will be seen that the friction stir welding tool of the present invention provides many advantages over other tools which have been developed heretofore. In particular, the present friction stir welding tool has various portions such as the shank, shoulder and pin portions which may be interchanged, or removed from the tool depending upon wear conditions, the material being welded, and other operational conditions or constraints. The present friction stir welding tool can be quickly disassembled, repaired, and/or replaced in a fashion not possible heretofore with respect to other similar tools.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A friction stir welding tool, comprising:
    a shank portion;
    a shoulder portion which is releasably engageable with the shank portion, and wherein the shoulder portion has a main body which has opposite first and second ends, and wherein the main body of the shoulder portion defines a pin passageway which extends from the first end and in the direction of the second end, and wherein the pin passageway has a diminishing cross-sectional dimension when measured in the direction which extends from the first end of the shoulder portion to the second end thereof; and
    a pin which is releasably engageable with the shoulder portion, and wherein the pin has opposite first and second ends, and an intermediate portion located between the first and second ends, and wherein the pin has a diminishing cross-sectional dimension when measured from the intermediate portion and in the direction of the first end thereof, and wherein the first end of the pin is telescopingly received, at least in part, in the pin passageway.

2. A friction stir welding tool as claimed in claim 1, and wherein the shank portion, shoulder portion and pin are fabricated from a substantially similar metal and/or metal alloy.

3. A friction stir welding tool as claimed in claim 1, and wherein the shank portion, shoulder portion and pin are fabricated from different metal and/or metal alloys.

4. A friction stir welding tool as claimed in claim 1, and wherein the shank portion, shoulder portion and pin are fabricated from substantially the same or dissimilar metals and/or metal alloys.

5. A friction stir welding tool as claimed in claim 1, and wherein the shank portion, shoulder portion and pin are fabricated from a metal and/or metal alloy which is selected from the group comprising high-temperature refractory metals such as tungsten, molybdenum, rhenium and their alloys; ceramics such as boron nitride and related compounds; and tungsten and related carbides.

6. A friction stir welding tool as claimed in claim 1, and wherein the shank portion has an elongated main body which defines a substantially longitudinally extending passageway, and wherein the shoulder portion is received, at least in part, in the longitudinally extending passageway.

7. A friction stir welding tool as claimed in claim 6, and wherein the main body of the shank has a first and an opposite second end, and wherein the longitudinally extending passageway extends between the first and second ends.

8. A friction stir welding tool as claimed in claim 6, and wherein the main body of the shank has a first and second end, and wherein the longitudinally extending passageway extends from the first end and in the direction of the second end.

9. A friction stir welding tool as claimed in claim 6, and wherein the elongated main body of the shank portion has opposite first and second ends, and wherein the longitudinally extending passageway extends from the first end in the direction of the second end, and wherein the longitudinally extending passageway has a diametral dimension which diminishes when measured from the first end, and in the direction of the second end.

10. A friction stir welding tool as claimed in claim 6, and wherein the shoulder portion includes a male member which is received in releasably mating receipt within the longitudinally extending passageway.

11. A friction stir welding tool as claimed in claim 10, and wherein the male member, and the main body of the shoulder portion are made integral one relative to the other.

12. A friction stir welding tool as claimed in claim 10, and wherein the main body of the shoulder portion has opposite first and second ends, and further defines a passageway which extends between the first and second ends, and wherein the male member is telescopingly received, at least in part, in the passageway and further extends longitudinally outwardly relative to the second end thereof, and wherein the male member further defines, in part, the pin passageway, and wherein the pin is telescopingly received, at least in part, in the pin passageway and extends longitudinally outwardly relative to the first end of the main body of the shoulder portion.

13. A friction stir welding tool as claimed in claim 1, and wherein the shank portion, shoulder portion and pin are each fabricated from a material which has a substantially similar thermal expansion coefficient.

14. A friction stir welding tool, comprising:
a shank portion which is defined by an elongated main body having opposite first and second ends and wherein the elongated main body defines a passageway which extends from the first end and in the direction of the second end;
a shoulder portion having a main body with opposite first and second ends and a male member which extends outwardly relative to the second end thereof, and wherein the male member of the shoulder portion is telescopingly received, at least in part, within the passageway as defined by the shank portion and is operable to releasably frictionally engage the main body of the shank portion; and
a pin which is releasably engageable with the shoulder portion and which extends outwardly relative to the first end of the shoulder portion, and wherein the shoulder portion defines a passageway which extends from the first end and in the direction of the second end, and wherein the passageway has a diminishing inside diametral dimension when measured along a line which extends from the first end of the shoulder portion to the second end thereof, and wherein the pin has a main body with opposite first and second ends, and wherein the pin has a diminishing outside diametral dimension when measured along a line extending from a location which is substantially midway between the first and second end and in the direction of each of the first and second ends of the pin.

15. A friction stir welding tool as claimed in claim 14, and wherein the passageway as defined by the shank portion extends between the first and second ends thereof.

16. A friction stir welding tool as claimed in claim 14, and wherein the passageway as defined by the shank portion has a diminishing cross-sectional dimension when measured along a line extending from the first to the second end of the shank portion.

17. A friction stir welding tool as claimed in claim 14, and wherein the main body of the shoulder portion is positioned in juxtaposed relation relative to the first end of the shank portion when the male member of the shoulder portion is received in the passageway as defined by the shank portion.

18. A friction stir welding tool as claimed in claim 14, and wherein the pin releasably frictionally engages the main body of the shoulder portion.

19. A friction stir welding tool as claimed in claim 14, and wherein the main body of the shoulder portion defines a passageway which extends from the first to the second end, and wherein the male member is telescopingly received, at least in part, in the passageway and extends, at least in part, outwardly relative to the second end of the shoulder portion, and wherein the male member frictionally engages the main body of the shoulder portion.

20. A friction stir welding tool as claimed in claim 19, and wherein the male member has a first, and an opposite second end, and wherein the male member defines a passageway which extends from the first end in the direction of the second end thereof, and wherein the pin is telescopingly received, at least in part, in the passageway which is defined by the male portion, and wherein the pin frictionally engages the male portion.

21. A friction stir welding tool as claimed in claim 19, and wherein the passageway as defined by the shoulder portion has a first and an opposite second end, and wherein the pin releasably frictionally engages the shoulder portion at a location which is located between the first end and a position intermediate the first and second ends of the passageway.

22. A friction stir welding tool as claimed in claim 14, and wherein the shank portion, shoulder portion and pin are fabricated from substantially the same material.

23. A friction stir welding tool as claimed in claim 14, and wherein the shank portion, shoulder portion and pin are fabricated from the and/or dissimilar materials.

24. A friction stir welding tool as claimed in claim 14, and wherein the shank portion, shoulder portion and/or pin are fabricated from a material having a substantially similar thermal coefficient of expansion.

25. A friction stir welding tool as claimed in claim 14, and wherein the shank portion, shoulder portion and pin are fabricated from a metal or metal alloy which is selected from the group comprising high-temperature refractory metals such as tungsten, molybdenum, rhenium and their alloys; ceramics such as boron nitride and related compounds; and tungsten and related carbides.

26. A friction stir welding tool, comprising:
a shank portion having an elongated main body with a first end, and an opposite second end, and wherein the main body of the shank portion defines a first passageway having a diminishing cross-sectional dimension when this cross-sectional dimension is measured along a line extending from the first end of the main body in the direction of the second end thereof;
a shoulder portion having a main body with a first and second end, and wherein the shoulder portion further has a male member which extends outwardly relative to the second end thereof, and wherein the male member has a size and shape which allows the male member to be releasably telescopingly received in the first passageway and to be advanced to a position wherein the male member frictionally engages the shank portion, and wherein the shoulder portion further defines a second passageway which extends from the first end of the shoulder portion in the direction of the second end thereof, and wherein the second passageway is substantially coaxially aligned relative to the first passageway and the male member, and wherein the second passageway has a diminishing cross-sectional dimension when measured along a line which extends from the first end of the shoulder portion toward the second end thereof; and
a pin having a main body with opposite first and second ends and wherein the second end of the pin, and at least a portion of the main body of the pin are releasably telescopingly received in the second passageway, and wherein at least a portion of the main body of the pin frictionally engage the main body of the shoulder portion, and wherein the first end of the pin extends outwardly and is located in spaced relation relative to the first end of the shoulder portion.

27. A friction stir welding tool as claimed in claim 26, and wherein the shank portion, shoulder portion and pin are made from a substantially similar material.

28. A friction stir welding tool as claimed in claim 26, and wherein the shank portion, shoulder portion and pin are fabricated from dissimilar materials.

29. A friction stir welding tool as claimed in claim 26, and wherein the shank portion, shoulder portion and pin are fabricated from materials which are selected to meet the welding needs of a given substrate which is being welded by the welding tool.

30. A friction stir welding tool as claimed in claim 26, and wherein the shank portion has a length dimension of less than about 2.5 inches, and outside diametral dimension of less than about 1 inch.

31. A friction stir welding tool as claimed in claim 26, and wherein the shoulder portion, including the male member has a length dimension of less than about 1.75 inches.

32. A friction stir welding tool as claimed in claim 26, and wherein the pin has length dimension of less than about 1 inch.

33. A friction stir welding tool, comprising:

a shank portion defining a first passageway having a diminishing cross sectional dimension;

a shoulder portion defining a male member having a size and shape which permits the male member to be releasably telescopingly received within the first passageway so as to frictionally engage the shank portion, and wherein the shoulder portion has a main body which further defines a second passageway which is coaxially aligned with the first passageway, and which has a diminishing cross sectional dimension; and a pin which is received at least in part within the second passageway and which releasably frictionally engages the shoulder portion.

* * * * *